United States Patent [19]

Faulkner

[11] E Re. 30,249

[45] Reissued Apr. 1, 1980

[54] ELECTRON DISCHARGE DEVICE INCLUDING AN ELECTRON EMISSIVE ELECTRODE HAVING AN UNDULATING CROSS-SECTIONAL CONTOUR

[75] Inventor: Richard D. Faulkner, Lancaster, Pa.

[73] Assignee: RCA Corporation, New York, N.Y.

[21] Appl. No.: 901,975

[22] Filed: May 1, 1978

Related U.S. Patent Documents

Reissue of:

[64] Patent No.: 3,875,441
Issued: Apr. 1, 1975
Appl. No.: 420,325
Filed: Nov. 29, 1973

U.S. Applications:

[63] Continuation of Ser. No. 711,845, Aug. 5, 1976, abandoned.

[51] Int. Cl.[2] ..... H01J 43/10; H01J 39/06

[52] U.S. Cl. ..... 313/104; 313/95; 313/102; 313/105 R; 313/326

[58] Field of Search ..... 313/95, 102–105, 313/326

[56] References Cited

U.S. PATENT DOCUMENTS

| | | | |
|---|---|---|---|
| 2,392,155 | 1/1946 | Kilgore | 313/399 |
| 2,922,064 | 1/1960 | Rodda | 313/94 |
| 3,244,922 | 4/1966 | Wolfgang | 313/95 |
| 3,660,654 | 5/1972 | Damoth et al. | 313/103 X |

FOREIGN PATENT DOCUMENTS 992938 5/1965 United Kingdom .

*Primary Examiner*—Eugene R. LaRoche
*Attorney, Agent, or Firm*—Eugene M. Whitacre; Glenn H. Bruestle; Vincent J. Coughlin, Jr.

[57] ABSTRACT

An electron emissive surface portion on one of a series of electrodes includes a cross-sectional contour substantially characterized by a superimposed undulating line of curvature which includes a plurality of interconnected arcuate regions.

6 Claims, 6 Drawing Figures

ELECTRON DISCHARGE DEVICE INCLUDING AN ELECTRON EMISSIVE ELECTRODE HAVING AN UNDULATING CROSS-SECTIONAL CONTOUR

Matter enclosed in heavy brackets [ ] appears in the original patent but forms no part of this reissue specification; matter printed in italics indicates the additions made by reissue.

*This is a continuation of reissue application Ser. No. 711,845, filed Aug. 5, 1976, now abandoned.*

BACKGROUND OF THE INVENTION

The present invention relates to electron discharge devices and more particularly to electron multipliers, and photomultiplier tubes.

Electron multipliers are used, for instance, as internal amplifiers in camera tubes and photomultiplier tubes. An electron multiplier is a device utilizing secondary electron emission to amplify or multiply electron current from an electron source, such as the photocathode of a photomultiplier or a thermionic cathode. The usual electron multiplier comprises a series, or chain, of secondary emitting dynodes, interposed between an electron source and an output collector of multiplied electrons. The dynodes are formed of or coated with secondary emissive material and impressed with progressively increasing potentials.

Electron multipliers are particularly useful for amplifying electron current produced by weak signals, such as light, nuclear radiation, or radiation in the electromagnetic spectrum. Photomultipliers are particularly useful for converting weak light signals into electron currents which are thereafter amplified by an electron multiplier within the photomultiplier. However, electron multipliers and photomultipliers have generally been limited in their ability to uniformly amplify information-significant components which are focused to impinge upon various points along their input surfaces. For example, I have found that the effective photosensitive area of certain prior art photomultipliers, such as the circular cage types, may be only a fraction of the total photocathode area provided. Also, in electron multipliers or photomultipliers, electron interstage skipping may produce undesirable fractional-photoelectron pulses in the output. Poor collection efficiency at the first electrode of a photomultiplier or of an electron multiplier may destroy the information-significant component of the input signal.

SUMMARY OF THE INVENTION

An electron discharge device includes a series of at least two electron optically aligned electrodes in which one of the electrodes comprises an anode. A means is provided for emitting a stream of electrons from preceding ones of said series of electrodes and for accelerating said electrons to impinge upon succeeding ones of said electrodes in sequence. The means for emitting a stream of electrons from the first of said series of electrodes, includes an electron emissive surface portion having a cross-sectional contour substantially characterized by an undulating line of curvature superimposed thereon which includes a plurality of interconnected arcuate regions.

DESCRIPTION OF THE PREFERRED EMBODIMENTS

Figure 1:
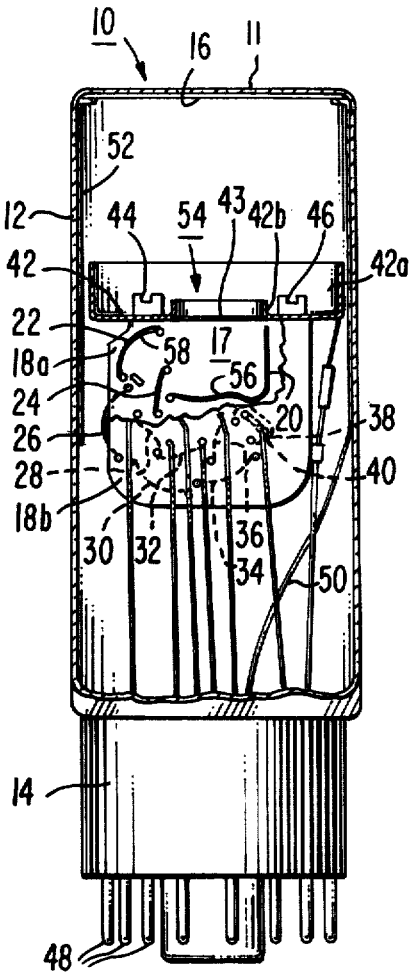
FIG. 1 is a cutaway perspective view of a photomultiplier having a circular cage electron multiplier made in accordance with the invention.

Referring to FIG. 1, there is shown a photomultiplier tube 10, as the preferred embodiment of an electron discharge device in accordance with the invention, having a cylindrical envelope 12. The envelope 12 comprises an evacuated glass bottle having a ceramic base 14 integrally sealed at one end. A semitransparent photocathode 16 is formed on the inner faceplate surface of an end portion 11 of the envelope 12.

An electron multiplier 17 is mounted inside the tube 10. Nine successive dynode electrodes 20–38 and an anode electrode 40, of the multiplier 17, are mounted in circular cage fashion between two parallel ceramic electrode mounting plates 18a and 18b. The respective electrodes are provided with an elongation in a direction perpendicular to the planes defined by the plates 18a and 18b (i.e., perpendicular to the cross-section of tube 10 depicted in FIG. 1).

An annular focusing ring electrode 42, having two upturned lip portions 42a and 42b, is interposed between the photocathode 16 and the electron multiplier 17. Ring 42 includes a substantially u-shaped cross-section. Ceramic plates 18a and 18b are secured to the ring 42 by means of tabs 44 and 46 which protrude through slots in the ring 42, forming therewith an integral assembly.

A plurality of lead-in pins 48, sealed through the base of the tube 10, provide electrically insulated leads to the interior of the tube 10. Each of the pins 48 is electrically interconnected within the tube to a corresponding electrode. For example, the photocathode 16 is electrically connected to one of the pins 48 by means of the wire 50 and an aluminized coating 52 disposed around the upper inner cylindrical surface region of the envelope 12. The aluminized coating 52 acts as a shield and, when interconnected to its operating potential, provides for the electrostatic focusing of electrons between the photocathode 16 and the electron multiplier 17 of the device.

In the operation of tube 10, the semitransparent photocathode 16 acts as a source of electrons which emits electrons in response to light which impinges thereon. These photoelectrons are electrostatically focused by means of the electron optics created within the tube between the cathode 16 and the electron multiplier 17. Suitable electrostatic field forces are generated in that region by the aluminized coating 52 and the annular focusing ring 42 whereby the electrons are accelerated through an aperture 54 in the ring 42 by applying appropriate potentials to respective interconnected pins 42. The aperture 54 preferably is covered with an electron permeable grid 43 as part of electron optic focusing structure, however, its use is not necessarily required and may be avoided without substantially affecting the operation of the device.

Photoelectrons emitted from the electron source 16 are thereafter focused to impinge upon an electron emissive surface 56 of the first dynode 20 of electron multiplier 17. The surface 56 consists of any of the known secondary emissive materials, such as, for example, a berillium oxide 56a coating on a copper berillium substrate 56b. This secondary emissive material releases several secondary electrons for each impinging electron. These emitted electrons are accelerated to impinge on a similar secondary emissive surface 58 on the next dynode 22, whereupon each produces more secondary electrons. This process is repeated at each successive dynode 24–38, in sequence. Thus, electrons entering the low potential input end of the electron multiplier are successively multiplied by secondary electron emission at each dynode 20–38. An electric field (electrostatic or magnetic) accelerates the secondary electrons from one dynode to the next successive dynode. The electrons emitted from the last dynode are collected by an anode 40 or collector of electrons.

The construction of various types of electron multipliers is well-known to persons skilled in the art of electron is discharge devices. Such devices may be constructed, for example, with their dynodes arranged in a circular cage fashion, as in FIG. 1, or as an elongated staggered series of dynodes as, for example, shown in U.S. Pat. No. 2,908,840 issued to R. H. Anderson on Oct. 13, 1959. Similarly, various constructions of photomultipliers are also well-known in the art, such as, for example, the "head-on" construction shown in FIG. 1, wherein light is focused head-on to impinge upon a circular end of the device, or wherein light is focused "side-on" to pass through a transparent side of an evacuated envelope (similar to 12), to impinge upon a photoemissive surface disposed on an electrode analogous to electrode 20. An example of the latter construction is, for example, disclosed in U.S. Pat. No. 2,702,865 issued to G. Herzog on Feb. 22, 1965. In the latter construction, the first electrode is provided with a reflective mode photocathode in lieu of the secondary emissive material 56a prescribed for the embodiment of FIG. 1 for the electrode 20.

In general, the prior art electron discharge devices, such as above described, include a curved or flat electron emissive electrode (such as electrode 20) upon which electrons from an electron source are focused, or upon which light is directly focused. In the embodiment of FIG. 1, the corresponding electrode is the first dynode electrode 20 of the electron multiplier 17. Alternatively, in the "side-on" construction, this electrode would comprise the electron source electrode or photocathode. Irrespective of the electron emissive phenomenon (i.e., photoemission or secondary electron emission) associated with this electrode (hereinafter referred to as "first electrode"), I have found a substantial nonuniformity in the output of the respective prior art devices at their respective anodes when the input energy source (i.e., the electrons of the electron source, or the light source) is scanned across the first electrode in a perpendicular or parallel direction relative to the planes defined by the major surfaces of spacers 18a and 18b.

I have discovered that certain changes in the cross-sectional contour of the first electrode may provide significant improvement in the uniformity of the sensitivity of response of such electron discharge devices.

Figure 2:
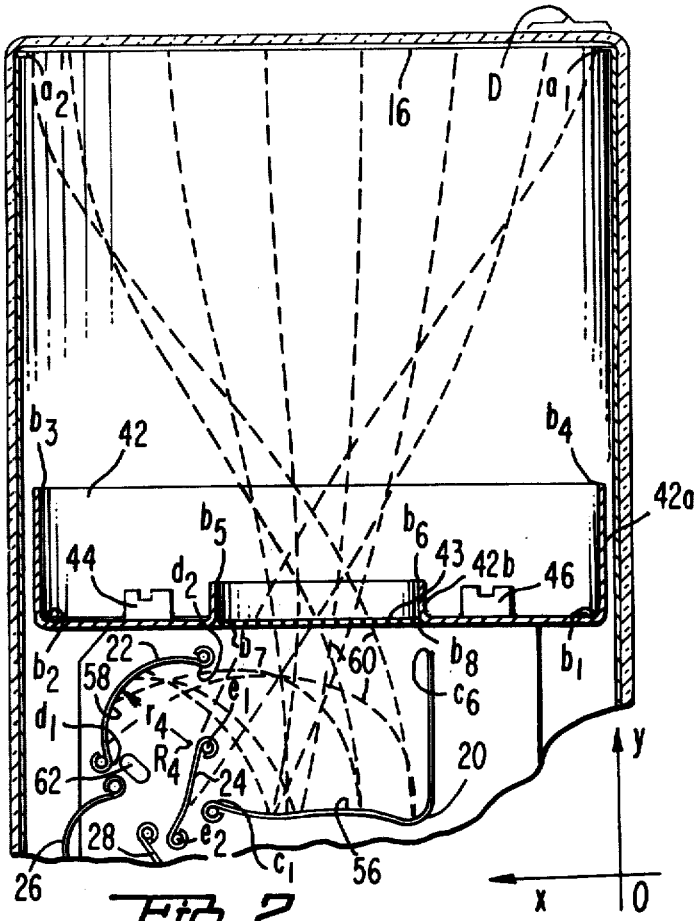
FIG. 2 is a diagrammatic depiction of so much of the device of FIG. 1 as is necessary to explain the contour and the relative arrangement of the electrodes required to achieve improved performance.
Figure 3:
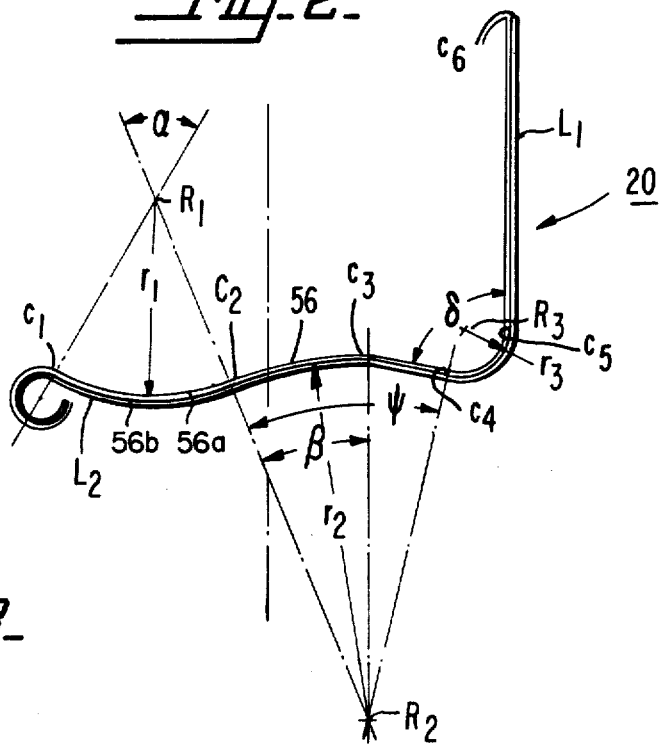
FIG. 3 is a diagrammatic depiction of the cross-sectional contour of an electron emissive surface made in accordance with the invention.

Referring to FIG. 2, an enlarged cross-sectional view of the novel electrode 20 and its position relative to immediately succeeding operative electrodes of the device is shown. Referring to FIG. 3, an even greater enlargement of electrode 20 is shown. Electrode 20 includes a substantially L-shaped cross-section including leg sections L1 and L2 (FIG. 3). The section L1 provides an electrostatic shield and establishes requisite field potentials in the region between dynodes 20, 22 and 24 for focusing electrons between these dynodes. Typical electron trajectories are for example, depicted in FIG. 2 by the dashed lines 60. The functional equivalent of section L1 may be, for example, also provided by a separate focusing structure (electrostatic or magnetic) and is not considered, of necessity, an integral part of the electrode 20.

Unlike the contour of prior art electron emissive surfaces, the novel electron emissive surface is provided with a cross-sectional contour which may be substantially characterized by an undulating line of curvature superimposed thereon (along the cross-section of section L2) which includes a plurality of interconnected arcuate regions. Principally, the novel electron emissive surface includes two interconnected arcuate regions defined by the angles $\alpha$ and $\Psi$, having a respective radii of $r_1$ and $r_2$.

The arcuate regions need not conform exactly to the cross-sectional contour of the electron emission surface. For example, the arcuate region defined by the angle $\Psi$ in FIG. 3 includes a region defined by the angle $\Psi-\beta$, which in turn, includes a straight line portion extending from point $C_3$ to $C_4$. Such minor modification of the undulating contour of the electron emissive surface may be provided so long as an adequate number of the respective electrons emitted from that region are collected by (i.e., impinge upon) the succeeding electrode. Similarly, numerous other geometrical modifications of the contour may be accomplished on a minor scale relative to the overall contour dimensions without substantially affecting the operational performance of the device. The relative magnitudes of the radii $r_1$, $r_2$ and the angles $\alpha$,$\Psi$ (and/or $\beta$) may be proportionately scaled in accordance with the size and arrangement of various electrodes incorporated into the device, as herinafter described.

Importantly, electron emission electrodes having an undulating cross-sectional contour, such as described, may be easily incorporated by persons skilled in the art into the prior art electron discharge devices, such as previously described, to provide substantially uniform collection of the electron stream emitted from the first electrode, substantially independent of the respective point of origin of various ones of the electrons along that cross-sectional contour.

Referring now to FIG. 2, the stream of electrons generated by secondary electron emission along the electron emissive surface 56 of section L2 of electrode 20 is accelerated and focused by the electron optics of the structure (primarily provided by electrodes 42, 20, 22 and 24), to impinge upon the electron emissive surface 58 of electrode 22 for subsequent electron multiplication within the device, as previously described. Additional focusing electrodes, such as rod 62, may also be included in the structure to aid in providing optimum electron optics for accelerating the electron stream between successive dynodes and for achieving optimum collection of electrons at the anode 40.

An operative embodiment of the disclosed photomultiplier approximately 3.8 cm. in diameter and 12.5 cm. long was constructed and tested. Critical dimensions and relative positioning of electrodes were established with reference to a coordinate designation system expressed in cm. having designations (X,Y) related to the origin "O" shown in FIG. 2. Pertinent points having coordinated values expressed in cm. and other variables were selected approximately as follows:

| | |
|---|---|
| Photocathode 16: | $a_1(0.0,5.70)$; $a_2(3.51,5.70)$ |
| Focusing ring 42: | $b_1(0.14,2.58)$; $b_2(3.44,2.58)$ |
| | $b_3(3.44,3.20)$; $b_4(0.14,3.20)$ |
| | $b_5(2.39,2.78)$; $b_6(1.19,2.79)$ |
| | $b_7(2.39,2.54)$; $b_8(1.12,2.54)$ |
| Dynode 20: | $c_1(2.31,1.54)$; |
| | $c_2(1.85,1.51)$; $c_3(1.50,1.57)$ |
| | $c_4(1.30,1.52)$; $c_5(1.14,1.65)$ |
| | $c_6(1.14,2.45)$; $\alpha = 52°15'$; |
| | $R_1(2.03,2.01)$ |
| | $r_1 = 0.53$; $\beta = 22°15'$; |
| | $R_2(1.47,0.66)$ |
| | $r_2 = 0.90$; $\psi = 35°$ |
| | $\delta = 75°$; $R_3(1.27,1.65)$; $r_3 = 0.13$ |
| Dynode 22: | $d_1(2.92,1.85)$; $d_2(2.44,2.34)$ |
| | $R_4(2.58,2.00)$, $r_4 = 0.38$ |
| Dynode 24: | $e_1(2.36,1.88)$; $e_1(2.54,1.32)$ |

The cathode was formed in a manner well-known in the art to consist a $K_2C_sS_b$ (Potassium-cesium-antimonide) photoemissive material. Secondary electron emissive electrodes were suitably formed of a 0.01 cm. thick copper berillium material. The construction and arrangement of the photomultiplier was, in other respects, substantially similar to RCA photomultiplier tube type 4,517 and/or other equivalent commercial types.

Figure 4B:
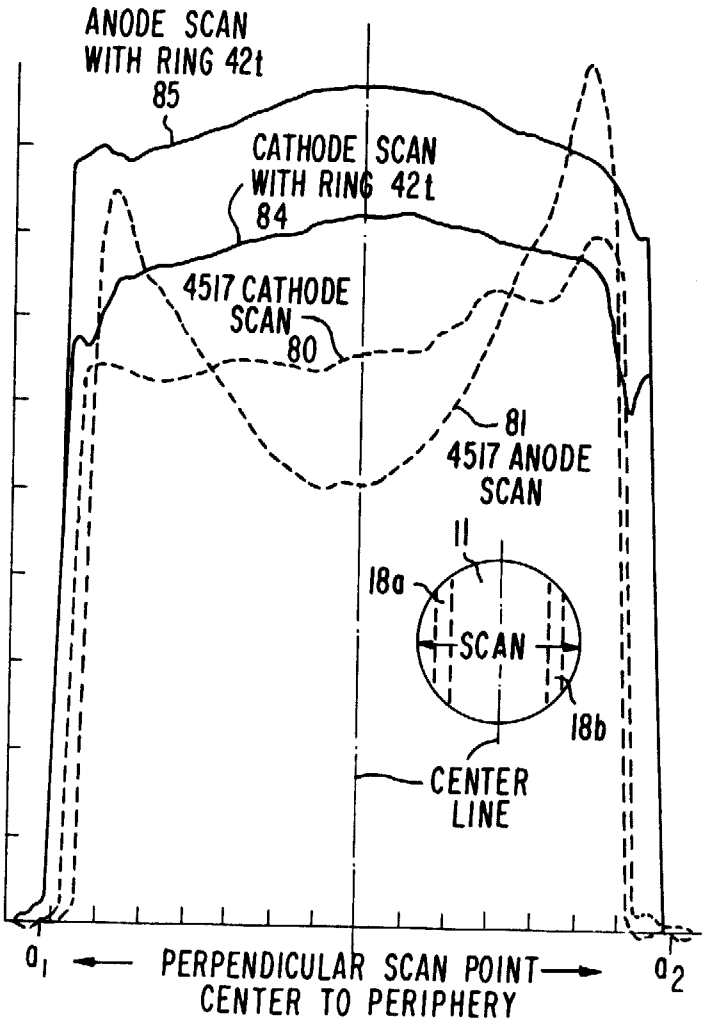
FIGS. 4a and 4b are a graphical comparison of the relative uniformity of sensitivity of the photomultiplier of FIG. 1 with a comparable prior art photomultiplier device for respective parallel and perpendicular scans relative to planes defined by the major surfaces of the ceramic electrode mounting plates 18a and 18b of the electron multiplier depicted in FIG. 1.
Figure 4A:
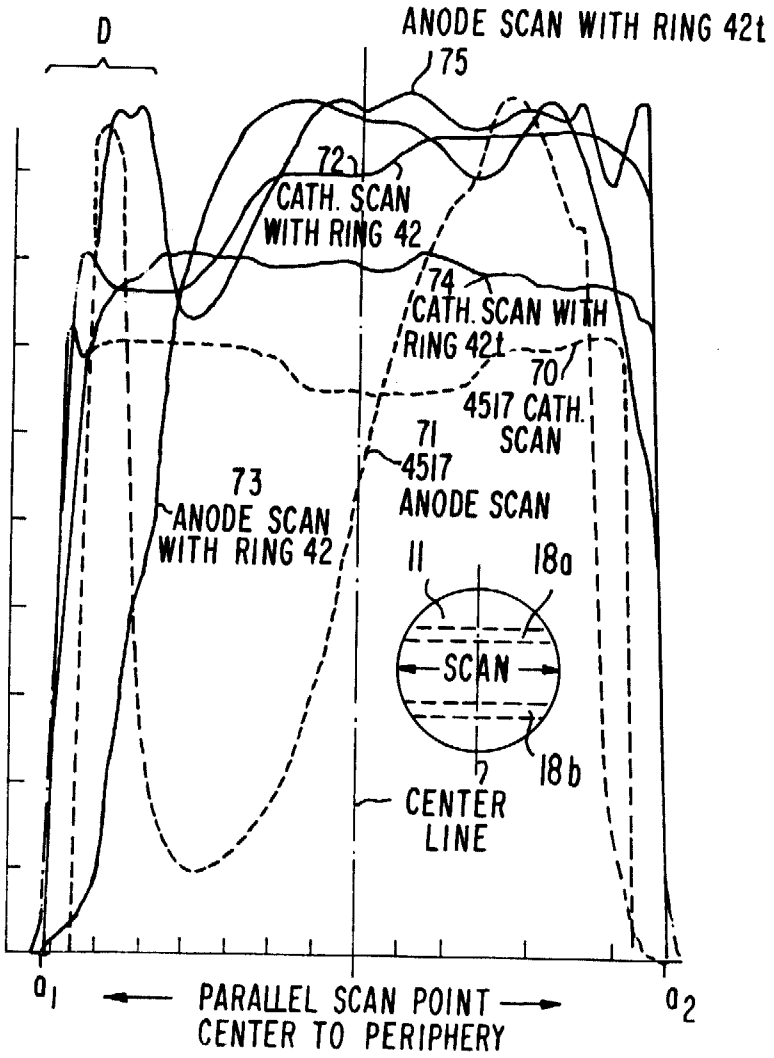

Referring to FIGS. 4a and 4b, comparative test data is shown relating the uniformity of response of the novel photomultiplier herein described (solid curves 72, 73, 74, 75, 84 and 85) with a comparable RCA type 4,517 photomultiplier (dashed curves 70, 71, 80 and 81). FIGS. 4a and 4b depict relative sensitivity test data obtained by scanning a small-diameter light source of fixed intensity approximately 1 mm. in diameter across the center line of the face of tube which includes the photocathode 16 of respective ones of the tested devices. More specifically, the curves of FIG. 4a depict sensitivity data for scans of the light source in a direction parallel to the planes defined by spacers 18a and 18b (parallel scans), whereas the curves of FIG. 4b are for scans of the light source in a direction perpendicular to the planes defined by spacers 18a and 18b (i.e., perpendicular scans).

The curves 70, 72, 74, 80 and 84 represent cathode scan curves, that is scan curves obtained by connecting the non photoemissive electrodes of the respective devices to act as anodes. These scans represent the anode signal current, in relative sensitivity, when the respective device is operative as a photo diode. Such cathode scan curves provide a visual depiction of the uniformity of response of each respective cathode as that cathode is scanned.

The curves 71, 73, 75, 81 and 85 are "anode scan" curves, that is, scan curves of the anode signal current obtained by operating the respective devices under normal recommended operating conditions In general, for uniform scan sensitivity to exist, the respective anode scan curves must follow a substantially similar contour as that depicted by the cathode scan curve of the same device. However, prior-art photomultiplier tubes, in general, have displayed relatively poor uniformity of sensitivity when scanned across their diameter by a uniform light source. For example, the dashed anode scan curves 71 (parallel scan) and 81 (perpendicular scan) for the comparable RCA tube 4,517 have markedly differing contours from their cathode scan curves represented by the dashed curves 70 and 80 respectively. In contrast, the anode scan test data obtained for the novel photomultiplier tube herein described is represented by the solid line curve 73 and provides a visual depiction of the substantial improvement in the uniformity of response of the device when that curve is compared with its respective cathode scan test data represented by the solid line curve 72.

Figure 5:
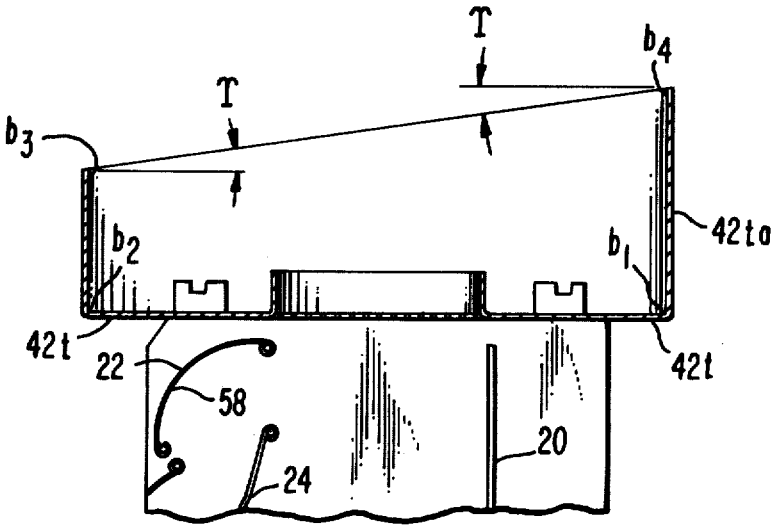
FIG. 5 is a perspective view of a modified annular focusing electrode for incorporation in the photomultiplier of FIG. 1.

With regard to the parallel anode scan obtained for the novel photomultiplier tube above described, represented by the solid curve 73, the sensitivity of the device is substantially lost in region "D" (FIGS. 2 and 4a). I have found that this apparent decreased sensitivity results from "electron skipping" in the region between the first dynode 20 and the second dynode 22. As shown, by the representative electron trajectories 60 (FIG. 2), a portion of the electron stream emitted from photocathode 16 is lost between the dynode 20 and the dynode 24 and does not impinge upon the electron emissive surface of dynode 22 (i.e., not collected by dynode 22). I have discovered that the replacement of the annular ring 52 with a tapered u-shaped annular focusing ring 42t, such as depicted in FIG. 5, provides a significant improvement in sensitivity in the "D" sensitivity region of the curve. A modified device incorporating the tapered annular focusing ring 42t (FIG. 5) was tested in a manner similar to that described for the various curves of FIGS. 4a and 4b. Referring to FIGS. 4a and 5b, the resulting cathode scan curve 74, 84 and the anode scan curves 75, 85 are shown for the modified device clearly indicating the substantial improvement in sensitivity in the "D" region.

Referring to FIG. 5, the tapered annular focusing ring 42t was constructed in a manner similar to ring 42 (FIG. 2). Coordinate dimensional data expressed above for points $b_1$–$b_3$ and $b_5$–$b_8$ (FIG. 2) remained unchanged—as did other pertinent constructional data for the novel device above described fully with reference to FIG. 2. Point $b_4$ was changed, however, to define a desirable symmetrical ring taper $\gamma$ for the outer lip 42ta of approximately 7°, wherein point $b_4$, defined as a coordinate point relative to the origin 0 (FIG. 2), was approximately equal to (0.140,3.602).

The addition of the novel electron emissive electrode herein described, in combination with the tapered annular focusing ring 42t, not only provides a substantial improvement in the uniformity of sensitivity of response as the novel electron emissive surface of the device is scanned, but, in addition, tubes so constructed have shown appreciable improvement in their general properties such as anode spatial uniformity, pulse height resolution and plateau characteristics.

In general, the first electron emissive electrode (analogous to the electrode 20 of electron discharge devices, such as herein described, may alternatively include an electron emissive material 56a suitable for use as a source of electrons or photocathode (such as, for example, cesiumantimony ($Cs_3Sb$). Electrons would originate from the photocathode surface in response to light focused to impinge thereon; in which case, the photocathode 16 and focusing electrode 42 (or 42t) described above may be omitted and a light permeable grid interposed adjacent to the electrode to provide desirable electron collection of emitted electrons at the succeeding electrode.

I claim:

1. An electron discharge device comprising:

a. a series of at least two electron optically aligned electrodes;

b. means for emitting electrons from preceding ones of said series of electrodes comprising an electron emissive surface region on each preceding one of said series of electrodes;

c. means for accelerating electrons emitted from each electron emissive surface region to impinge upon a succeeding one of said electrodes; said emitted electrons being accelerated as a stream of electrons, from a first electrode of said series, to impinge upon succeeding ones of said series in nonrepeating sequence;

d. one of said electrodes comprising an anode for ultimately collecting said electron stream;

e. wherein said electron emissive surface region of [the first] *at least one other* of said series of electrodes includes, *across its width* a cross-sectional contour substantially characterized by an undulating line of curvature superimposed thereon which includes a plurality of interconnected arcuate regions, *said undulating line of curvature providing substantially uniform collection by a succeeding electrode of the electron stream emitted from the undulating surface region, substantially independent of the respective point of origin of various ones of the electrons along the cross-sectional contour*; and f. means whereby said [first] *other* electrode may be excited to a substantially single electrostatic field potential across the entire electron emissive surface portion characterized by said undulating line of curvature.

2. An electron discharge device in accordance with claim 1, additionally including a transparent envelope, and wherein said electron emissive surface region of said first electrode is photoemissive.

3. An electron discharge device in accordance with claim 1, additionally including:

a. a transparent envelope, and b. an semitransparent photocathode electrode on an inside surface portion of said transparent envelope.

4. An electron discharge device in accordance with claim 3, wherein said accelerating means includes:

an electrostatic electron focusing electrode interposed between said photocathode electrode and said first electrode, said focusing electrode comprising an annular ring having a U-shaped cross-section, said ring including a centrally located aperture and inner and outer lip portions whereby electrons emitted from said photocathode are accelerated through said aperture to impinge upon said first electrode.

5. An electron discharge device in accordance with claim 4, wherein the outer lip portion of said annular ring defines a symmetrical lip taper relative to the axial portion of said ring.

*6. An electron discharge device in accordance with claim 1 wherein said undulating line of curvature includes a succession of at least two curves curving in alternate directions.*

* * * * *

UNITED STATES PATENT AND TRADEMARK OFFICE
CERTIFICATE OF CORRECTION

PATENT NO. : Re. 30,249

DATED : 4/1/80

INVENTOR(S) : Richard D. Faulkner

It is certified that error appears in the above-identified patent and that said Letters Patent is hereby corrected as shown below:

Column 3, line 32 delete "is" before "discharge".

Column 5, line 30 "$e_1$" second occurrence should be --$e_2$--.

Signed and Sealed this

*Fifteenth* Day of *July 1980*

[SEAL]

*Attest:*

SIDNEY A. DIAMOND

*Attesting Officer*

*Commissioner of Patents and Trademarks*